United States Patent [19]
Fishman et al.

[11] 3,780,536
[45] Dec. 25, 1973

[54] ICE CREAM MAKER

[75] Inventors: Aaron Harry Fishman, Hewlitt Harbor; George Parmett, Seaford, both of N.Y.

[73] Assignee: APL Corporation, Great Neck, N.Y.

[22] Filed: Jan. 26, 1973

[21] Appl. No.: 326,714

[52] U.S. Cl.............. 62/342, 62/457, 259/DIG. 34
[51] Int. Cl. ............................................. F25c 7/06
[58] Field of Search ............... 62/342, 457; 165/94; 259/DIG. 34

[56] References Cited
UNITED STATES PATENTS

| | | | |
|---|---|---|---|
| 2,809,498 | 10/1957 | Allen | 62/342 |
| 631,817 | 8/1899 | Railsback | 259/DIG. 34 |
| 2,288,044 | 6/1942 | Stemme | 62/457 |

*Primary Examiner*—William E. Wayner
*Attorney*—A. D. Caesar et al.

[57] ABSTRACT

Apparatus is disclosed for making a frozen dessert of the ice cream type. The apparatus includes a cylindrical vessel having an outer generally cylindrical wall, a horizontally extending bottom wall which is integral with said cylindrical wall and a vertically extending post which extends coaxially with the cylindrical wall and extends upwardly from the bottom wall. The vessel is open ended at its upper end for receiving a liquid mass from which a frozen dessert can be made. The wall and the post are hollow and have therein a chamber. The chamber has a refrigerant therein for freezing the liquid mass. A scraping member is provided for removing the mass from the walls of the vessel as the mass is frozen by the loss of temperature through the shell of the walls and the post.

4 Claims, 6 Drawing Figures

PATENTED DEC 25 1973
3,780,536
SHEET 1 OF 3
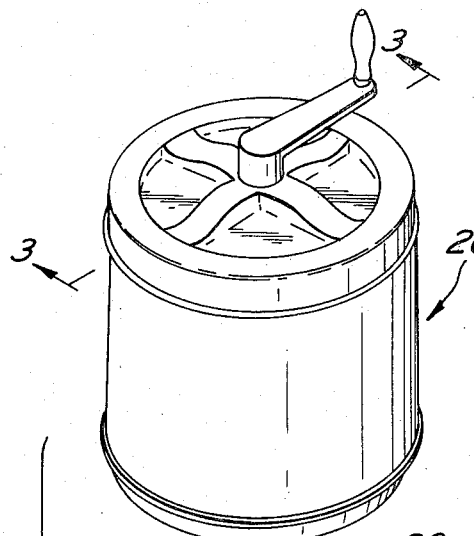
FIG.1
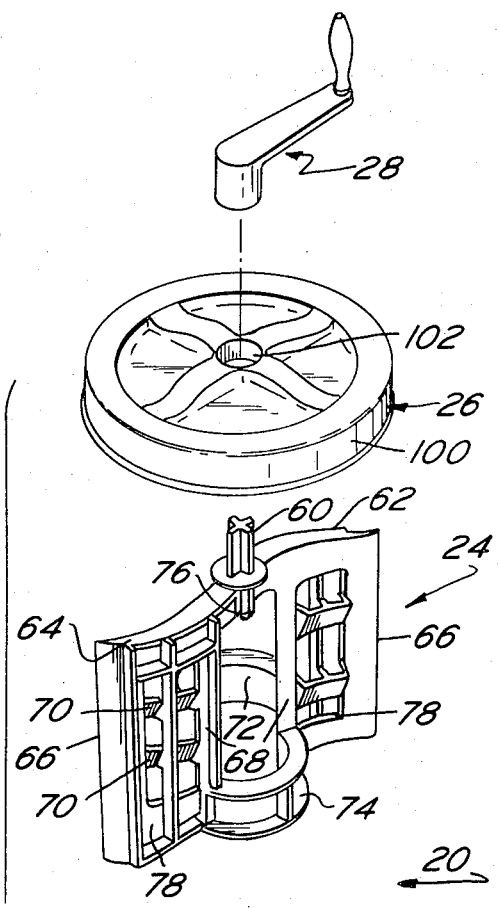
FIG.2
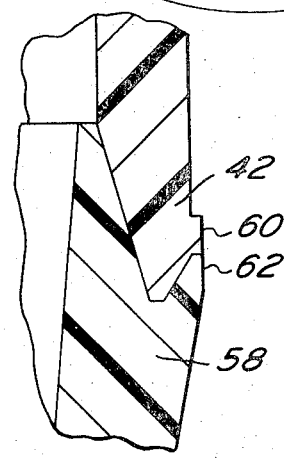
FIG.6
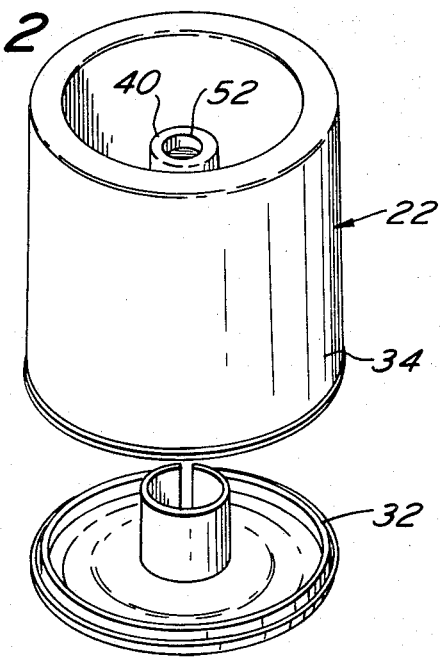

3,780,536

ICE CREAM MAKER

This invention relates generally to ice cream making and more particularly to a new and improved apparatus for making a frozen dessert of the ice cream type which is capable of doing so with ordinary pudding-type dessert.

Portable or personal ice cream making apparatus have suffered from the following disadvantages:

the ice cream must be made from a liquid mass formed of expensive dairy products;

the time required for making the ice cream is too long and the work required is too extensive;

finally, the cost of the personal or portable ice cream making apparatus is very expensive in view of the complicated structures required for the transfer of heat from the liquid mass to the refrigerant for the purposes of freezing the liquid mass in making the ice cream.

The following patents are illustrative of the prior art: U.S. Pat. Nos. 491,104, Feb. 7, 1893; 944,625, Dec. 28, 1909; 1,950,781, Mar. 13, 1934; 1,978,176, October 23, 1934; 2,288,044, June 30, 1942; 2,526,165, Oct. 17, 1950; 2,744,391, May 8, 1956; 2,809,498, Oct. 15, 1957; 3,433,651, Mar. 18, 1969; 3,668,886, June 13, 1972.

Typically, the prior art systems require a liquid mass made of the diary products which are conventionally used to make ice cream. The devices are, for the most part, very slow in making ice cream and, where the object of the prior devices was to make the ice cream making process quicker, the elaborate heat exchange elements which have been provided add considerably to the costs of these prior devices.

It is therefore an object of the invention to overcome the aforementioned disadvantages of the prior art.

Yet another object of the invention is to provide a new and improved apparatus for making a frozen dessert of the ice cream type.

Still another object of the invention is to provide a new and improved apparatus for making a frozen dessert of the ice cream type which is adapted to use commercially available pudding mixtures as the liquid mass for making the ice cream.

Yet another object of the invention to to provide a new and improved apparatus which utilizes a unique structure for facilitating the heat exchange between the liquid mass and the refrigerant for increasing the speed with which ice cream can be made.

Still another object of the invention is to provide a new and improved ice cream maker which is adapted for personal use and which is easily carried by the user and is simple to use.

These and other objects of the invention are achieved by providing apparatus for making a frozen dessert of the ice cream type. The apparatus comprises a cylindrical vessel having an outer generally cylindrical wall, a horizontally extending bottom wall and a vertically extending post which extends coaxially with the cylindrical wall and is integral with and extends upwardly from the bottom wall. The vessel is open ended at its upper end for receiving the liquid mass from which the dessert can be made. The walls and the post are hollow and have therein a chamber. The chamber in the walls and post has a refrigerant therein for freezing the liquid mass. A scraping member is provided for removing the mass from the walls of the vessel as the mass is frozen by the loss of temperature through the walls and the post.

Other objects and many of the attendant advantages of this invention will be readily appreciated as the same becomes better understood by reference to the following detailed description when considered in connection with the accompanying drawings wherein:

FIG. 1 is an exploded perspective view of the ice cream maker embodying the invention and the holder therefor;

FIG. 2 is an enlarged exploded perspective view of the ice cream maker;

FIG. 6 is an enlarged view of the section taken within the area 6 of FIG. 3.

Referring now in greater detail to the various figures of the drawings wherein like reference numerals refer to like parts, an ice cream maker embodying the invention is shown generally at 20 in FIG. 1.

Figure 3:
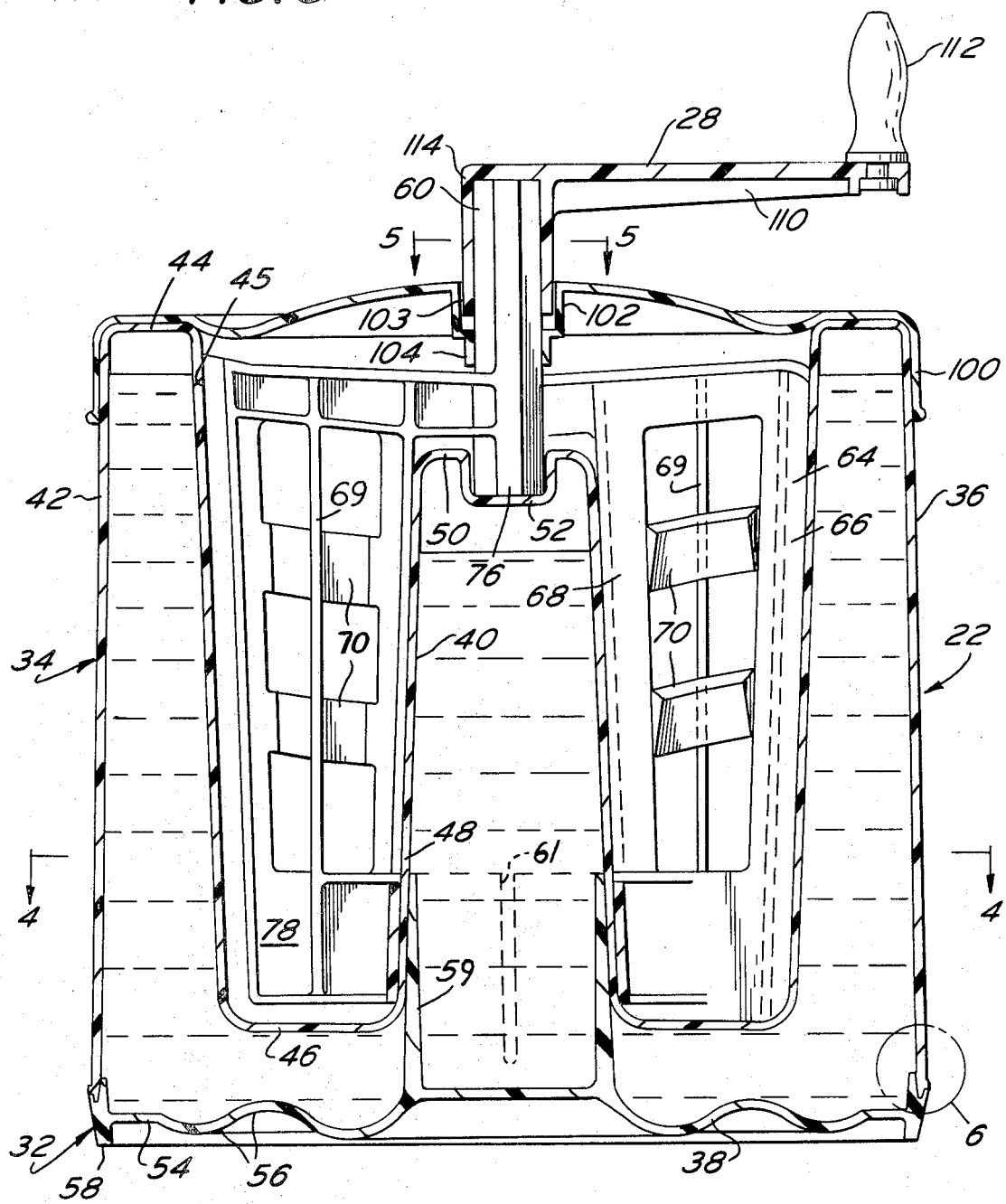
FIG. 3 is an enlarged sectional view taken along the line 3—3 of FIG. 1.
Figure 4:
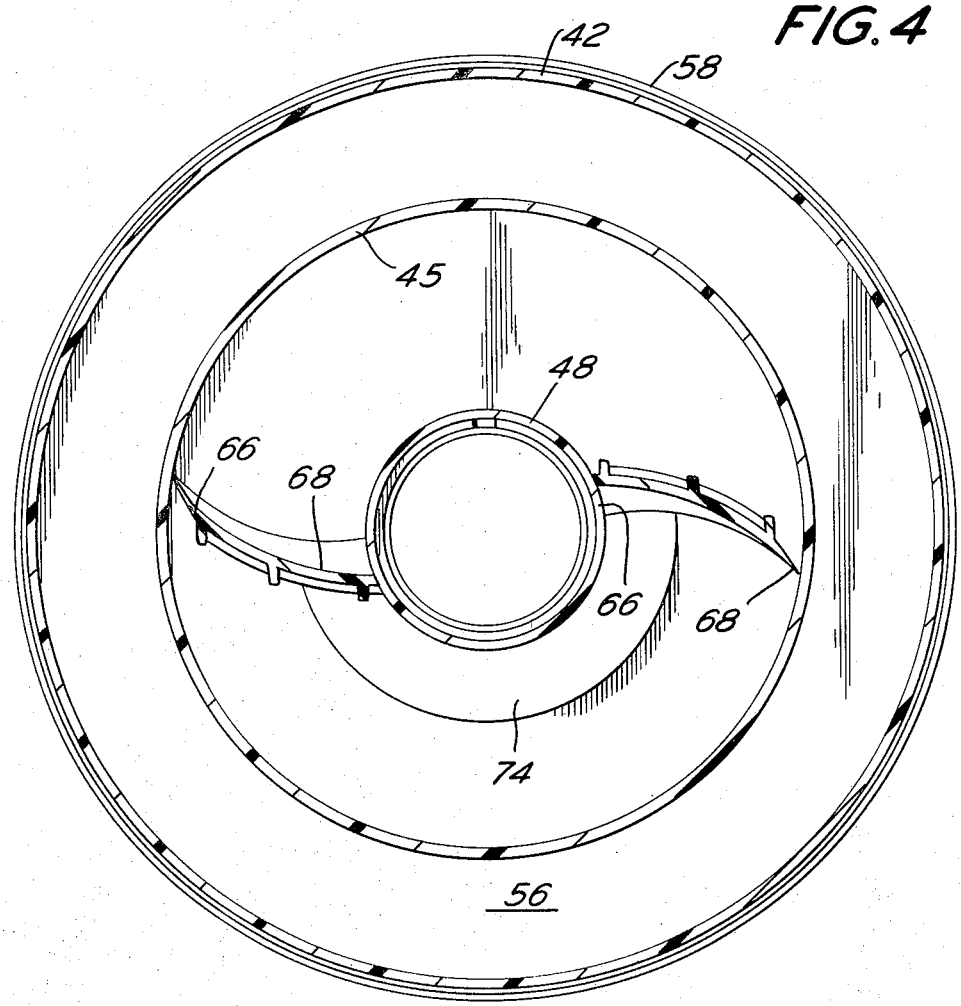
FIG. 4 is a sectional view taken along the line 4—4 of FIG. 3.

As best seen in FIGS. 1 and 2, the ice cream maker 20 basically comprises a vessel or tub 22, a dasher 24, a cover member 26 and a hand crank 28. Referring to FIG. 1, a cup shaped flexible holder 30 which is preferably made of styrofoam is also provided for holding and insulating the ice cream maker when ice cream is being made therein.

The vessel 22 is preferably comprised of a thermoplastic such as a low density polyethylene and acts as a receptacle for a liquid mass from which the ice cream type of dessert can be made. The vessel 22 is basically comprised of a base member 32 and a generally cylindrically shaped top member 34. As best seen in FIG. 3, the vessel 22 basically comprises a generally vertical and cylindrical wall 36, a horizontally disposed bottom wall 38 and a generally cylindrical upstanding post 40 which extends coaxially with the cylindrical wall 36 and is secured at its lowermost end to the bottom wall 38 of the vessel.

The top portion 34 of the vessel is thus formed of a cylindrical outer shell 42 which extends vertically and is integral with a top panel 44 which is annular and disposed horizontally and is in turn integrally secured to an inner cylindrical shell 45. Shell 45 and shell 42 in combination with the panel 44 act to form the hollow wall 36. The inner shell 45 is integrally secured at its lowermost end to an annular bottom panel 46 which is also disposed in a horizontal plane and is connected to the cylindrical shell 48 which forms post 40. The shell 48 has integrally secured at the top thereof a circular end panel 50 which includes a recess 52.

The base member 32 includes a generally horizontally disposed panel 54 which includes ridges 56. At the center of the base 32 is a cylindrical projection 59 which is disposed at the center of the base and extends coaxially with the cylindrical shell 48 which forms post 40. At the periphery of the base 32 a cylindrical collar 58 which is integral with panel 54 is provided to facilitate securement between the top and base portions 34 and 32, respectively, of the vessel.

As best seen in FIG. 6, the lowermost end of the outer cylindrical sheet 42 of the vessel has a somewhat pointed edge which is adjacent a flange 60 and the annular collar 58 includes a complementary recess for receipt of the end of the shell 42. The flange 60 rests on a shoulder 62 and the shell 42 and is preferably joined to the annular collar 58 of the base 32 by a spin weld. The cylindrical projection 59 includes vertically extending slots 61. The projection 59 fits within the shell 48 when the base 32 is secured to top portion 34. The slots 61 permit passage of a refrigerant between the hollow walls 36 and 38 and the post 40.

As can best be seen in FIG. 3, the welding of the top member 34 to base 32 forms a sealed compartment within the walls 36, 38 and post 40. Prior to the spin weld of the base to the top portion of the vessel, a refrigerant is placed inside the post 40 and the wall 36 so that the refrigerant is sealed therein by the securement of the base to the top portion of the vessel.

The dasher 24, preferably comprises a thermoplastic such as high impact polystyrene and is best seen in FIG. 2 and basically comprises a crank shaft 60 which is integral with an S-shaped bracket 62 which supports a pair of scraping members 64 and 66. Each of the scraping members basically includes an outer scraper 66 and an inner scraper 68 which are connected together by a pair of veins 70. The veins 70 are integrally connected between the scrapers 66 and 68 but are disposed at opposing angles with respect thereto in order to enable circulation and create turbulance of the liquid mass within the vessel as the scrapers are rotated about the post within the vessel 22. Integrally secured to the veins 70 is a vertically extending rib 69. Rib 69 is provided on each of members 64 and 66 for structural rigidity.

The dasher 24 also includes a pair of semi-circular brackets 72 and 74. The upper bracket 72 is integrally secured to and centrally of the inner scraper 68 of the scraping members 64 and 66.

The bracket 74 is also integrally secured to the inner scraper 68 at the bottom thereof and extends laterally in the opposite direction from the scraping member 68. The brackets 72 and 74 embrace and surround diametrically opposed surfaces of the post 40 when the scraping members are inserted into the vessel 22.

Disposed below the crank shaft 60 is a projection 76 which depends from the crank shaft 60 and like the crank shaft 60 is of a cross-shaped cross-section.

The scrapers 66 and 68, when inserted in vessel 22, are disposed respectively against the inner shell 54 of wall 36 and the shell 48 of post 40. As the crank shaft 60 has applied thereto a clockwise torque, the scrapers 66 and 68 ride along the surfaces of the shell 50, 45 and 48. Thus, when a liquid mass is provided within the wall 36, walls 38 and between post 40 and the refrigerant within the sealed compartment within the vessel 22 is frozen, the ice formed against the shells 45 and 48 is scraped off to increase the speed of freezing the entire mixture provided within the vessel.

Referring back to FIG. 1, the cover member 26 is preferably comprised of a thermoplastic such as low density polyethylene and includes a cylindrical skirt 100 which extends about the cover 26. As best seen in FIG. 3, the skirt 100 overlaps the topmost edge of the wall 36 of the vessel 22 when the ice cream making apparatus is assembled as seen in FIGS. 1 and 3.

As also best seen in FIG. 2, the cover member includes an opening 102 at the center thereof through which the crank shaft 60 of the dasher extends. As best seen in FIG. 3, the opening 102 includes an enlarged portion 103 and a narrow portion 104. Only the crank shaft 60 fits within the reduced portion 104 while the hand crank 28, which is fitted over the crank shaft 60 also fits within the enlarged portion 103.

Figure 5:
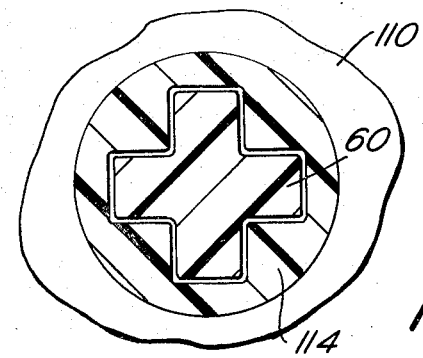
FIG. 5 is an enlarged sectional view taken along the line 5—5 of FIG. 3.

The hand crank 28 is preferably comprised of a thermoplastic such as high impact polystyrene and basically includes an arm 110 and a handle 112. At the opposite end of the arm 110 is a socket 114 which, as best seen in FIG. 5, receives the crank shaft 60.

In operation, the vessel 22 is placed in the freezing compartment of a refrigerator for approximately 12 hours.

When a frozen dessert is ready to be made from a liquid mass, the vessel is removed from the freezer and is placed within the holder 30 which is cup shaped and is adapted to snuggly receive the vessel 20. Since the holder 30 is insulated, very little heat can be drawn into the vessel 20 from the outer shell 42 thereof. The liquid mass from which the frozen dessert is made is then placed within the vessel 22 between the wall 36 and the post 40. The dasher 24 is then placed in the vessel with the depending projection 76 inserted in recess 52 of post 50 and the brackets 72 and 74 embracing the post 40. The vessel is then placed in the freezer for approximately 30 minutes and is then removed. The cover member 26 is then placed over the top of the vessel 22 with the crank shaft 60 extending through opening 102 of the cover member 100. The crank shaft 28 is then assembled on the crank shaft 60 by inserting the socket 114 over the end of the crank shaft 60. The hand crank is then rotated clockwise looking down at the ice cream maker 20 and a dessert having a frozen consistency similar to ice cream is then quickly formed from the liquid mass within the vessel 22.

It should be noted that the thickness of wall 36 of vessel 22 is tapered towards the top and the diameter of post 40 is tapered toward its top while scraping members 62 and 64 are tapered toward the bottom. This causes a better fit between the scraping members and the shells 45 and 48 as well as ease of placing the dasher in the vessel.

The speed of production of the dessert is enhanced by the formation of ice against the shell of the vessel 22 which is a part of the post 40 and the wall 36 which provides a large surface area through which heat may be removed from the liquid mass. In addition, the scraping causes a very quick transmission of the heat from the liquid mass as the frozen material is placed within the body of the liquid mass quickly by the scraping action. This also enables more quick freezing of the liquid mass that is against the shell of the vessel.

The refrigerant may be any conventional coolant which freezes at a temperature of less than 25° F. such as brine. The freezing point is preferably below 25° F. to enable the freezing of the liquid mass to form the dessert.

In addition to the normal creamy dairy products which are normally used to make ice cream, the ice cream maker will also make frozen desserts using ingredients such as JUNKET, JELLO, pudding mixes and other confections.

It can therefore be seen that the ice cream maker is not only inexpensive but also, can operate on inexpensive liquid masses to provide an ice cream type of dessert. No electricity is required since the ice cream maker is merely inserted into the freezing compartment of a refrigerator. The refrigerant, because it is self contained, does not cause any mess and requires little cleaning up afterwards.

Without further elaboration, the foregoing will so fully illustrate our invention that others may, by applying current or futher knowledge, readily adapt the same for use under various conditions of service.

What is claimed as the invention is:

1. Apparatus for making a frozen dessert of the ice cream type, said apparatus including a cylindrical vessel having an outer generally cylindrical wall, a horizontally extending bottom wall which is integral with said cylindrical wall and a vertically extending post which extends coaxially with said cylindrical wall and extends upwardly from said bottom wall, said vessel being open ended at its upper end for receiving a liquid mass from which a frozen dessert can be made, said walls and said post being hollow and having therein a chamber in which a refrigerant is provided for freezing said liquid mass, a scraping member for removing said mass from the walls of said vessel as said mass is frozen by the loss of temperature through the shell of said walls and said post, said scraping member including a scraper for removing ice formed on said post and a scraper for removing ice formed on said cylindrical wall, said scraping member also including a crank shaft which is in turn connected to a hand crank, said hand crank enabling torque to be applied to said scraping member for rotation thereof in said vessel, a cover member which fits over the top of said vessel, said crank shaft extending through an opening provided in said cover, said hand crank being removable from said crank shaft so that said cover can be removed without removing said scraping member, said scraping member further incuding a depending projection which extends from said crank shaft, said post including a recess for receiving said depending projection including facilitate the rotation of said scraping member in said vessel, said projection being journaled in said recess with said post supporting said scraping member.

2. The apparatus of claim 1 wherein said scraping member is comprised of two scraping parts, each of which are spaced about said projection and are diametrically separated by said post.

3. The apparatus of claim 2 wherein said scraping member further includes a pair of semi-circular brackets which are secured between said two parts, said brackets fitting about said post to journal said scraping member thereabout.

4. The apparatus of claim 1 and further including a holder for receiving said vessel when said vessel is removed from the freezing compartment of a refrigerator to insulate said vessel from receiving heat when removed from said freezing compartment.

* * * * *